J. T. WILSON.
LAP JOINT FOR PACKINGS.
APPLICATION FILED MAR. 6, 1909.
942,024.
Patented Nov. 30, 1909.
2 SHEETS—SHEET 2.
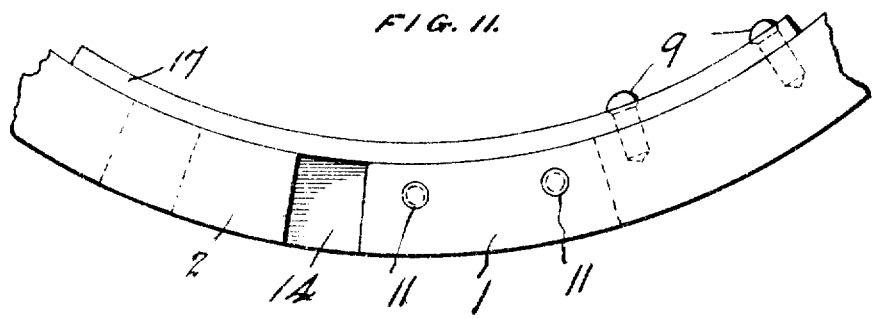
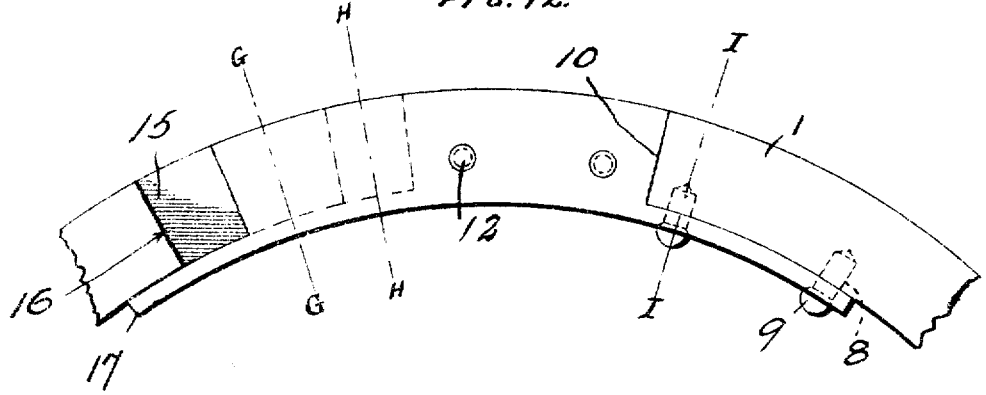
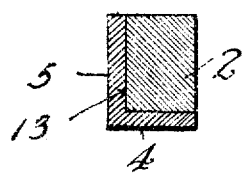  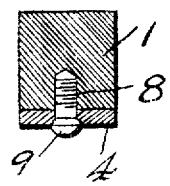
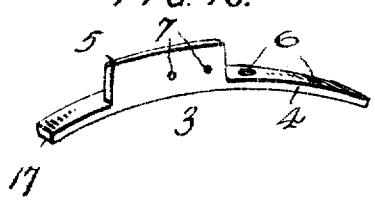
WITNESSES
C. K. Davis
Ralph Wormelle
INVENTOR
J. T. Wilson
By F. E. Stebbins, Attorney

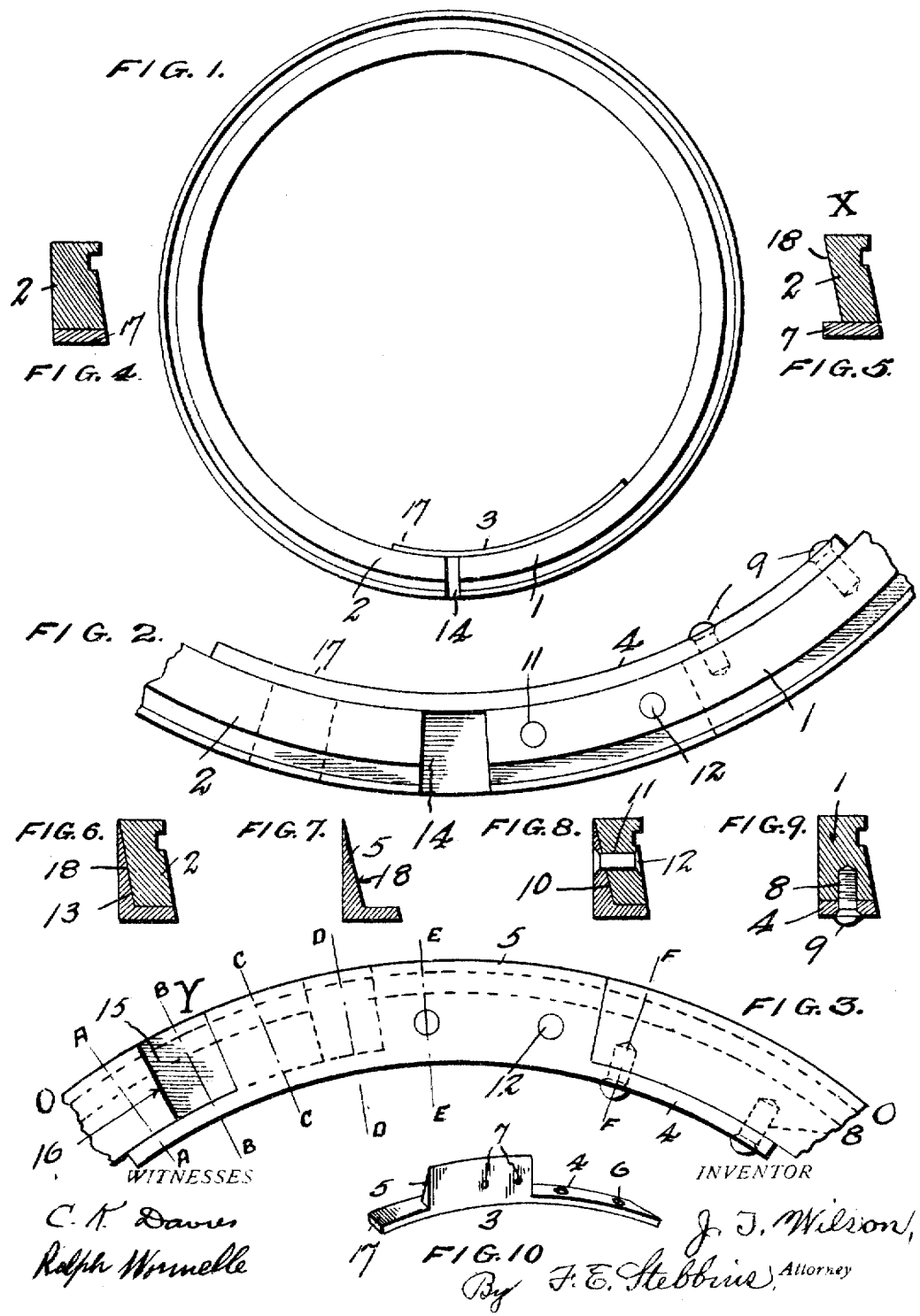

UNITED STATES PATENT OFFICE.

JOHN T. WILSON, OF JERSEY SHORE, PENNSYLVANIA.

LAP-JOINT FOR PACKINGS.

942,024.

Specification of Letters Patent. Patented Nov. 30, 1909.

Application filed March 6, 1909. Serial No. 481,728.

*To all whom it may concern:*

Be it known that I, JOHN T. WILSON, a citizen of the United States, residing at Jersey Shore, in the county of Lycoming and State of Pennsylvania, have invented certain new and useful Improvements in Lap-Joints for Packings, of which the following is a specification.

The object of my invention is the provision of an improved lap joint for packing rings generally, such as are used in connection with pistons and piston valves, and in combination with other devices where a fluid or steam-tight joint is requisite.

The invention consists in certain novelties of construction and combinations of parts as hereinafter set forth and claimed.

The accompanying drawings illustrate two examples of the physical embodiment of the invention constructed according to the best modes I have so far devised for the practical application of the principle.

Figure 1 is a plan view of a piston snap ring having the improved lap joint. Fig. 2 is an enlarged section of Fig. 1. Fig. 3 shows the opposite side of Fig. 2. Figs. 4, 5, 6, 7, 8 and 9 are sections on lines A, B, C, D, E, F of Fig. 3. Fig. 10 is a perspective view of the joint plate. Fig. 11 shows a second example, the same being a section of a packing ring. Fig. 12 shows the opposite side of Fig. 11. Figs. 13, 14 and 15 are sections on lines G, H, I of Fig. 12. Fig. 16 is a perspective view of the second form of the joint plate.

The numeral 1 designates one end of a packing ring; 2, the adjacent end which in practice is adapted to move toward and away from the end 1; or end 1 may have movement relative to end 2; or both ends may be adapted to move; 3, an integral joint plate made separate from the ends, or the entire plate may be comprised of parts immovably connected; 4, the bottom plate; 5, the side plate of less length than the bottom plate so one end of the latter will project some distance; 6, holes at one end of the bottom plate; 7, holes at one end of the side plate; 8, two threaded holes at the inner surface of end 1 of the ring; 9, two screws passed through holes 6 in the bottom plate and seated within the holes 8, as shown; 10, a recess formed by cutting away part of the material at the side of end 1 for a suitable distance to receive one end of the side plate 5, the other end projecting beyond the end 1 for a suitable distance; 11, two holes through end 1 in line with holes 7 of the side plate; 12, rivets passed through the holes 11 and 7 and headed and countersunk so as to firmly secure the side plate to the end 1, said rivets with the screws 9 connecting the joint plate bodily to the end of the ring and so that the periphery and side of the ring will present plain and continuous surfaces; 13, a recess formed by cutting away part of the material at the side of end 2 of the ring and sufficiently deep to receive the free end of the side plate 5 so that when the latter is in frictional contact with the surface defining the recess the top edge of the plate will be in line with the top surface of the end 2 and the side surface of the plate lie in the same plane as the side surface of the ring; 14, a normally open space between the adjacent ends 1 and 2 of the packing or ring; 15, a normally open space between the free end of side plate 5 and the surface 16 bounding the recess formed in end 2 of the ring; and 17 is the free end of bottom plate 4 extended beyond the side plate 5 and also beyond and beneath the open space 15 and in frictional contact with the inner surface of the end 2 of the ring.

As thus far described, the two examples are substantially or generically the same and have functions the same. Obviously, the end 1 of the ring carrying the joint plate can approach and recede from the adjacent end 2 or each or both ends move in contracting and expanding and a steam or fluidtight joint be maintained.

On reference to the second example, Figs. 11 to 16, it will be seen that the opposite surfaces of the bottom plate, and the opposite surfaces of the side plate, are in parallel planes, and that the side surfaces of the recesses in the ends 1 and 2 are of a shape corresponding to the shape of the side plate so that when the parts are united plain side and top surfaces are presented or formed. This example is especially adapted for use in connection with pistons and piston valves which have a groove or grooves to receive the ring or rings in frictional contact with the side surfaces bounding a groove, and obviously the lap joint of the ring, when so used, will not bind in expanding and contracting.

In the first example, which shows a ring especially adapted for use as an element of a compound packing for a piston valve, it is desirable that the width of the outer bearing surface at X shall be as wide as possible, or that the sectional area of the recess at Y shall be as small as possible, so to secure this end I have varied the construction as follows: The surface 18 of the side plate is beveled or inclined and the side surfaces defining the recesses at the ends 1 and 2 of the ring are also beveled or inclined to match the surface 18 and lie in close frictional contact therewith.

On reference to Fig. 3 it will be observed that the top corner edge of the packing from O to O is in a continuous line, or substantially so, even where it crosses the space at Y, consequently when this edge passes the edge of a port there is no break or notch for the premature blowing through of the steam.

In the examples shown the bottom plate and side plate are integral or immovably united and the side plate shorter than the bottom plate. In all cases it is desirable that the end 17 of the bottom plate shall project beyond the side plate so it can extend beyond the recess in the side of end 2 of the ring or packing.

What I claim is:

1. A lap joint for a packing comprising two ends 1 and 2 of a packing, and a joint plate having a bottom plate and a side plate united, the side surfaces only of the ends 1 and 2 being recessed to receive the side plate, and said joint plate secured to one of the said ends.

2. A lap joint for a packing comprising two ends 1 and 2 of a packing, and a joint plate having a bottom plate and a side plate united, the side surfaces of the ends 1 and 2 being recessed to receive the side plate, and said joint plate secured to one of the said ends; the end 17 of the bottom plate projecting beyond the side plate, and frictionally engaging the under surface of end 2, in substance as set forth.

3. A lap joint for a packing comprising two ends 1 and 2 of a packing, and a joint plate having a bottom plate and a side plate one surface of which is beveled or inclined and said plates united, the side surfaces of the ends 1 and 2 being recessed and provided with beveled or inclined surfaces, and said joint plate secured to one of the said ends; the end 17 of the bottom plate projecting beyond the side plate and frictionally engaging the under surface of end 2, in substance as set forth.

4. A lap joint for a packing comprising two ends 1 and 2 of a packing, and a joint plate having a bottom plate and a side plate united said bottom plate having its ends extended beyond each end of the side plate, the side surfaces of the ends 1 and 2 being recessed to receive the side plate, and said joint plate secured to one of the said ends and so the bottom plate will lie in frictional contact with the inner surfaces of the said two ends.

In testimony whereof I affix my signature in presence of two witnesses.

JOHN T. WILSON.

Witnesses:
W. BRUCE HARLAN,
R. M. BUBB.